United States Patent [19]

Kanaoka et al.

[11] Patent Number: 4,553,833
[45] Date of Patent: Nov. 19, 1985

[54] SIDE PRINTING APPARATUS

[75] Inventors: Takeshi Kanaoka; Shigehisa Shimizu, both of Kanagawa, Japan

[73] Assignee: Fuji Photo Film Co., Ltd., Kanagawa, Japan

[21] Appl. No.: 575,538

[22] Filed: Jan. 31, 1984

[30] Foreign Application Priority Data

Feb. 2, 1983 [JP] Japan ............................. 58-12761[U]

[51] Int. Cl.$^4$ ............................................. G03B 27/52
[52] U.S. Cl. ....................................... 355/40; 352/92; 346/107 R
[58] Field of Search ............................. 355/39, 40, 1; 346/107 R; 352/92

[56] References Cited

U.S. PATENT DOCUMENTS

| | | | |
|---|---|---|---|
| 3,512,158 | 5/1970 | Scarbrough | 346/76 PH |
| 3,952,311 | 4/1976 | Lapeyre | 346/107 R |
| 3,988,742 | 10/1976 | Meier et al. | 346/107 R |
| 4,042,298 | 8/1977 | Herrmann | 346/107 R |
| 4,119,974 | 10/1978 | Ondis et al. | 346/145 |
| 4,150,882 | 4/1979 | Konick | 352/92 |
| 4,215,920 | 8/1980 | Butler | 352/92 |
| 4,424,523 | 1/1984 | Snelling et al. | 346/107 R |
| 4,435,064 | 3/1984 | Tsukada et al. | 346/107 R |

FOREIGN PATENT DOCUMENTS

| | | |
|---|---|---|
| 49-109480 | 9/1974 | Japan . |
| 51-107281 | 8/1976 | Japan . |
| 53-76929 | 6/1978 | Japan . |
| 56-38341 | 4/1981 | Japan . |
| 56-16589 | 4/1981 | Japan . |
| 57-163226 | 10/1982 | Japan . |

Primary Examiner—Monroe H. Hayes
Attorney, Agent, or Firm—Young & Thompson

[57] ABSTRACT

A side printing apparatus includes a plurality of light emitting members arranged in a line perpendicular to the forward direction of a film so as to provide several kinds of dot patterns which are exposed on the film as latent images of characters, symbols and so on. A detector for detecting the film position is provided to produce position signals which operate to cause a control to drive selectively the light emitting members to emit light in accordance with the position signals. The light rays from the light emitting members are focussed on the film as light spots.

6 Claims, 9 Drawing Figures

SIDE PRINTING APPARATUS

BACKGROUND OF THE INVENTION

The present invention relates to apparatus which, in photographic film manufacturing processes, applies characters, symbols or the like such as manufacturer's film type, frame number, expiration date, production lot number, and the like to the marginal portions of film strip.

In such apparatus which are generally called side printing apparatus, there is provided a light image forming device having a number of light emitting elements disposed in matrix arrangement which can form a light image of dot pattern to be exposed on the photographic film and thereby provided as a latent image. Such apparatus are more fully disclosed in Japanese Utility Model unexamined publication No. 76,929/1978 and Japanese Patent unexamined publication No. 163,266/1982.

The apparatus described above is attended with an unavoidable shortcoming characterized by the provision of a number of driving circuits and connecting wires for the respective light emitting elements. As a result, it follows that the apparatus is of great bulk and high manufacturing cost. Furthermore, it is difficult to make a number of light emitting elements uniform in brightness.

SUMMARY OF THE INVENTION

It is therefore the primary object of the present invention to provide a side printing apparatus which can reduce the number of light emitting elements used for providing light images.

It is another object of the present invention to provide a side printing apparatus which has a simple construction and can be manufactured at low cost.

It is a further object of the present invention to provide a side printing apparatus wherein it is easy to make light emitting elements uniform in brightness.

For accomplishing these objects of the present invention, there is provided in the apparatus a dot pattern forming device which comprises light emitting members of the number N arranged in a line perpendicular to the forward direction of the photographic film and each adapted to be able to emit light intermittently m times so as to form an N×m dot patttern with light spots. By exposing the photographic film to the dot pattern, the film is printed with the described characters, symbols and the like as latent images.

The above and other objects and features of the present invention will become more apparent from the following description of a preferred embodiment of the present invention taken in conjunction with the accompanying drawings.

DETAILED DESCRIPTION OF THE INVENTION

Figure 1:
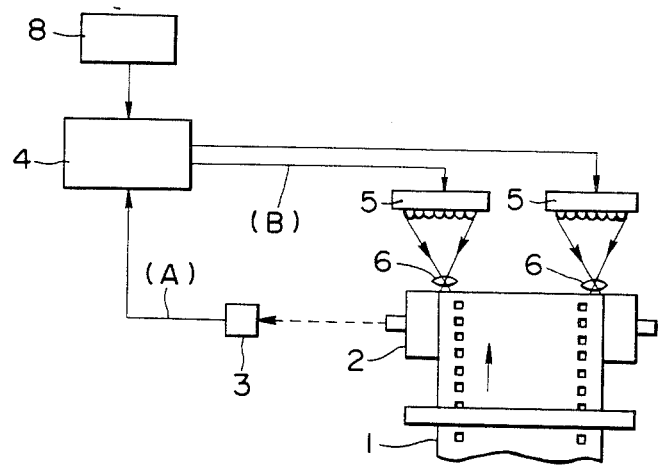
FIG. 1 is a schematic block diagram of a side printing apparatus for roll film, to which the present invention is applied.

Referring now to the drawings, wherein like numerals denote like parts or positions, there is shown diagramatically in FIG. 1 side printing apparatus suitable for roll film in accordance with the present invention. A strip of photographic film 1 to which latent images of dot pattern characters, numerals symbols or the like should be applied is illustrated as extending from some convenient supply such as a roller or spool (not shown). The strip 1 is transported lengthwise in the direction indicated by arrow. The advancing or transporting means for the strip 1 may be of a well-known type. To position accurately the strip 1 in the printing station, there is provided a roller or drum 2 adapted to rotate as a result of the advancement the strip 1 because of the strip is in close contact with the peripheral surface of the drum 2. Operationally associated with the rotatable drum 2, there is provided a rotary encoder 3 which is adapted to provide position signals (A) of which the number is proportional to the length of the strip 1 advanced. The position signals (A), which, in turn, are supplied to control means 4, operate to cause the control means 4 to provide output signals (B) for driving a dot pattern forming device 5, especially light emitting elements provided therein. The light emitting elements are controllably driven to emit light which, in turn, is focussed on the marginal portion of the strip 1 through a converging lens 6.

Figure 2:
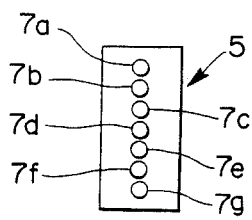
FIG. 2 is a plan view showing an embodiment of a dot pattern forming assembly used in the apparatus of FIG. 1.
Figure 3:
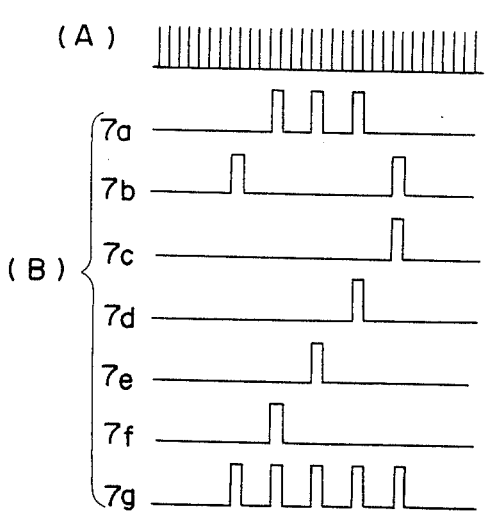
FIG. 3 is a wave-form chart of signals input to and output from the control device of the apparatus of FIG. 1.
Figure 4:
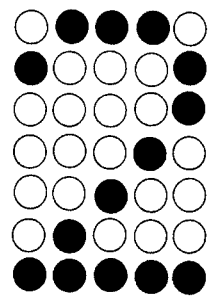
FIG. 4 is a schematic illustration of a developed image.

The dot pattern forming device 5 shown in FIG. 2 as a preferred embodiment thereof comprises a plurality of, for example seven in this embodiment, light emitting elements, such as LEDs 7a to 7g arranged at regular intervals and in a line perpendicular to the forward direction of the strip 1. Each element 7 of the device 5 is caused to emit light intermittently under programed control so as to provide a dotted line with light spots which can be exposed on the strip 1. It is therefore apparent that, by causing the respective elements 7a to 7g to emit light intermittently under programed control, the device 5 can display a dot pattern with light spots every specified advancement of the strip 1. When the drive signals (B) for the elements, which can be provided from the control means 4 in such a way as will be mentioned later, are supplied to respective drive circuits of the elements 7a to 7g, the elements are caused to emit light intermittently in synchronism with the receipt of signals and independently of each other so as to display a dot pattern forming a light image of a character, in this embodiment the numeral "2" as shown in FIG. 4. The light image of the character is then exposed onto the marginal portion of the strip 1 and thereby printed thereon as a latent image. In FIG. 4, block dots represent exposed spots and white dots exposable positions on the marginal portion of the strip 1.

Figure 5:
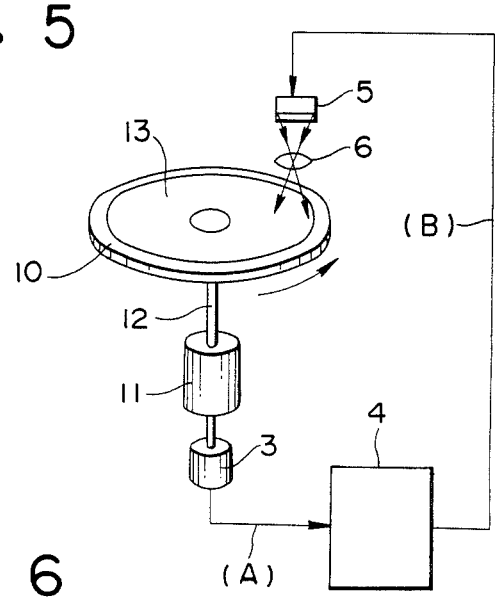
FIG. 5 is a schematic diagram of a side printing apparatus for disk film, to which the present invention is applied.

Referring to FIG. 5 showing the apparatus suitable for applying latent images to disk film, there is shown a rotatable table 10 supported on shaft 12 which during operation, is continuously driven by a constant speed motor 11. On the surface of the table 10, a disk film 13 is placed and secured by preferable mounting means (not shown). The drive of the table 10 is, of course, detected by means of the rotary encoder 3 operationally associated therewith for providing output signals proportional to the drive. The output signal operates to cause the control device 4 to provide drive signals which, in turn, are applied to and thereby drive the dot pattern forming device 5 so as to produce a dot pattern with light spots. As a result, the disk film at the marginal portion is printed with a desired character of dot pattern as a latent image. It should be noted that in this embodiment, the light emitting elements are arranged radially in a line.

Figure 6:
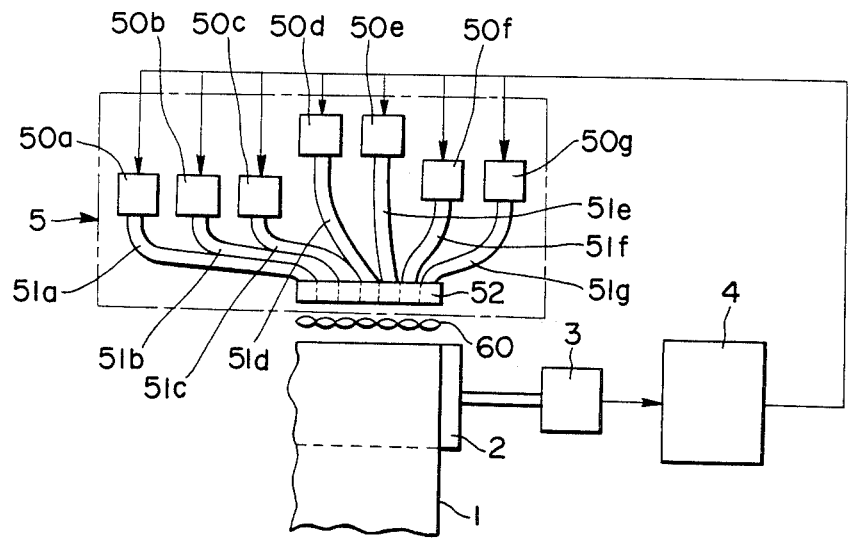
FIG. 6 is a plan view showing another embodiment of the dot pattern forming assembly used in the apparatus according to the present invention.

FIG. 6 shows another dot pattern forming assembly, wherein there are provided seven light emitting devices each comprising light emitting elements 50a to 50g with light guide members 51a to 51g such as light transmitting optical fibers well-known per se. The exit ends are supported on mounting means 52 in a line. A group of lenses 60 each aligned with a respective light guide member 51a to 51g are provided to focus light beams from the light guide members onto the film strip 1. As is apparent from the embodiment, light emitting elements of a large size, for instance semiconductor laser light sources, may be utilized because there is no requirement of line arrangement of light emitting elements. Such laser light sources, which can emit high intensity light in comparison with light emitting diodes (LED), various types of lamps and the like, are more suitable for high speed printing.

Figure 7:
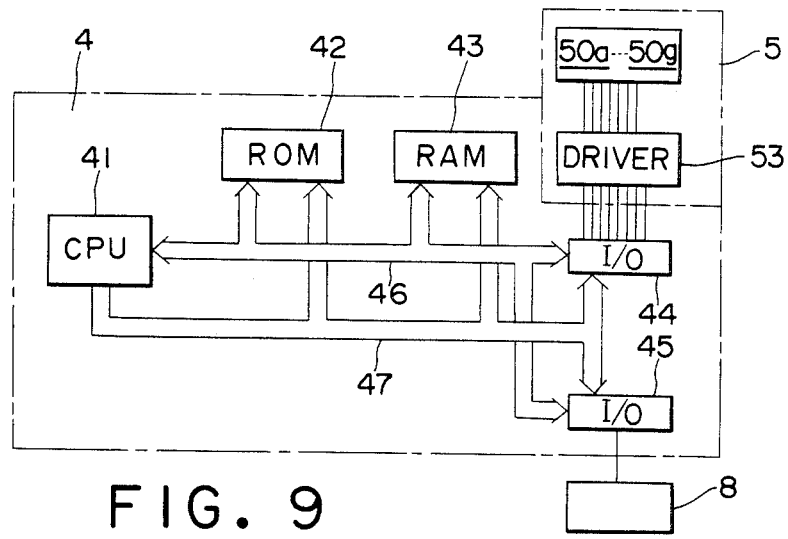
FIG. 7 is a diagram showing a control device for the operation of the dot pattern forming assembly.

FIG. 7 shows an embodiment of the control device 4 used in the side printing apparatus in accordance with the present invention. In FIG. 7, when printing information such as film type, film size, expiry date, production lot number, and the like is entered into setting means 8, data corresponding to the information are provided to a random-access-memory (RAM) 43 through I/O port 45 and stored therein at predetermined addresses in order of demand. A central processing unit (CPU) 41 can operate to retrieve the data under a control program stored in a programmable read-only-memory (ROM) 42 and provide the retrieved data to I/O port 44 adapted to drive a driver 53 to selectively causing the elements 50a to 50g to emit light. Numerals 46 and 47 in FIG. 7 denote the data bus and address bus, respectively.

Figure 8:
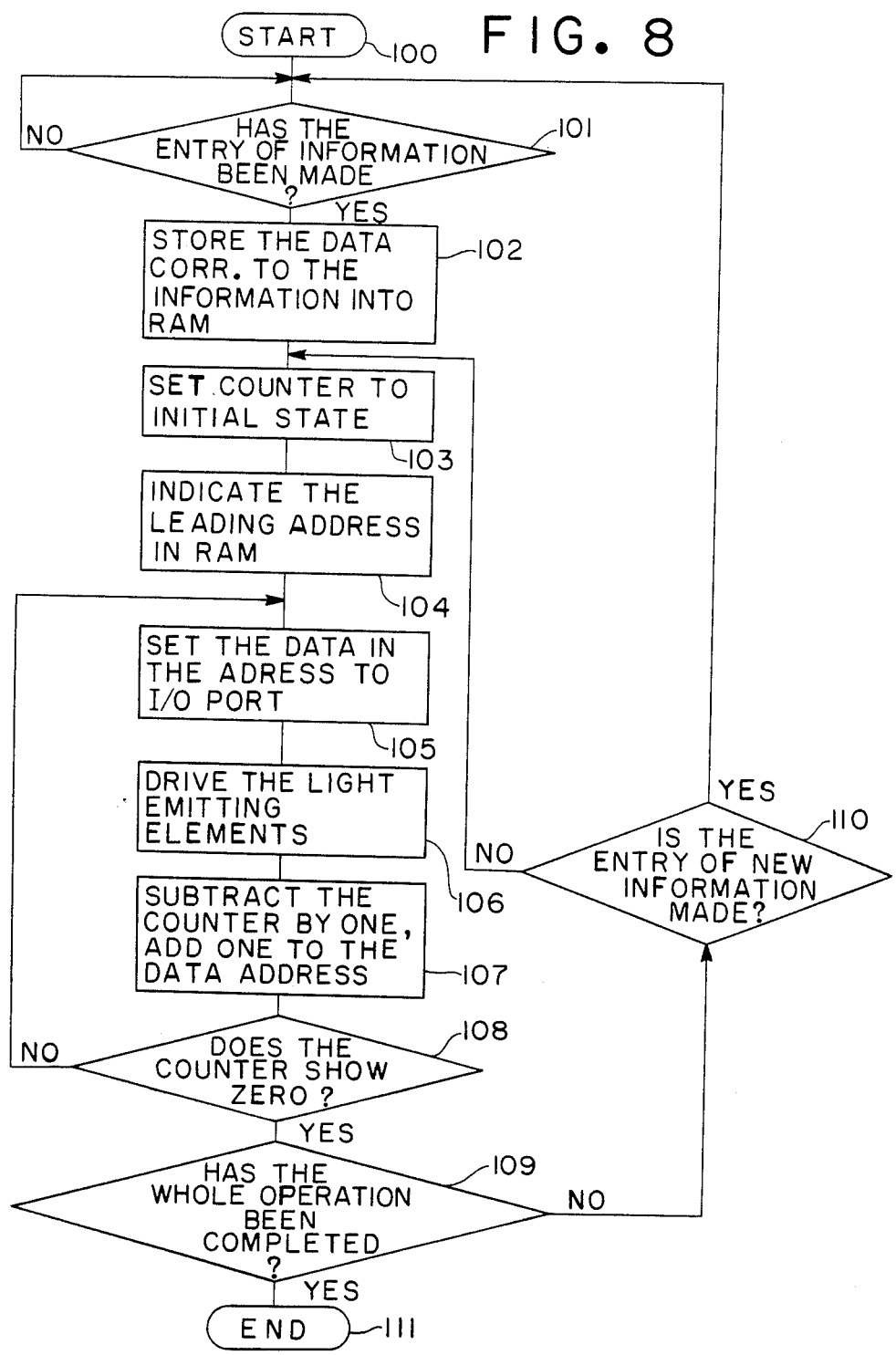
FIG. 8 is a flow-chart describing the sequential operation of the control device of FIG. 7.

Referring now to FIG. 8, there is shown a flow-chart describing a sequence for the control device. The first step 101 is to read the entry of the information into the setting means 8 after starting the sequence, to determine dot patterns with light spots to be produced by the dot pattern forming device or assembly. Then a first decision is made: "has the entry of the information been made?". If the answer to the first decision is no, the first decision is made again. If the answer to the first decision is yes, data corresponding to the information entered are provided to and stored in a RAM 43 in the order of demand. At the step 103, a counter is set to a value equivalent to the number of light emissions in a cycle (for a roll of film strip or a sheet of film disk). At the next step 104, leading address for the data is set in a RAM. At the following step 105 the data in the address indicated is set to the I/O 44. The I/O 44 utilizes the latch circuit gates on the output therefrom for a predetermined period in order to maintain the light emitting elements 50a to 50g driven to emit light at the next step 106. At the termination of the period, the CPU 41 subtracts the counter by 1 and adds 1 to the DATA address at the step 107. A second decision is made at the step 108; "Does the counter show zero?". If the answer to the second decision is no, this orders return to the step 105 so as to set other data in the I/O port 44. This sequence from the step 105 to the step 108 is repeated until the count has reached 0 (zero). On the other hand, if the answer to the second decision is yes, another decision is made at the following step 109: "has the whole operation been completed?". If the answer to the other decision is yes, the program is ended. If the answer to the other decision is no, a new decision is made: "is the entry of new information made?". If the answer to the new decision is no, this order returns to the step 103 for second cycle. On the other hand, if the answer to the new decision is yes, these orders return to the initial step 101 for the entry of new information.

Figure 9:
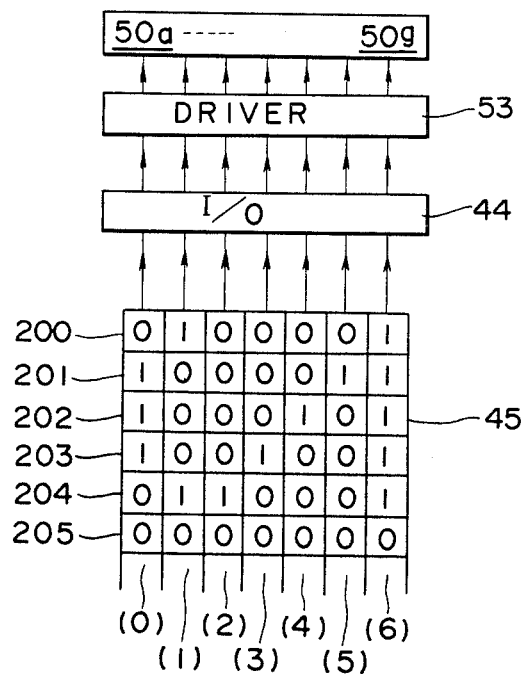
FIG. 9 is a schematic diagram showing a concept of the dot pattern forming operation.

As described, it thus becomes possible to drive directly the light emitting elements to emit light in the order 200, 201, 202, 203, 204, and 205 shown in FIG. 9 by storing the data in order of demand of light emission in the RAM 43 in advance when changing the information such as film type, film size and so on. In FIG. 9, numerals 200 to 205 represent successive addresses and the single digit numerals (0), (1), (2), (3), (4), (5) and (6) represent the respective bits for light spots to be produced. In the case that the light emitting elements are driven to emit light in accordance with the data in the respective address and in the order shown in FIG. 9, the dot pattern display assembly will provide the numerals "2" in dot pattern as shown in a FIG. 2.

Because when using a general purpose character generator available on the market in side printing apparatus, it is necessary to provide code signals to the character generator and then transform them into drive signals for selectively driving light emitting elements, a large number of parts are required for constructing the apparatus and furthermore, time is wasted controlling the apparatus. On the contrary, the side printing apparatus according to the present invention can be constructed using a reduced number of parts and thereby manufactured at low cost. Additionally, control time for the apparatus can be reduced, resulting in high speed printing. Furthermore, using the setting means 8 enables the apparatus to be changed quickly in operation mode.

While preferred embodiments of the present invention have been shown and described, it will be apparent that changes and modifications can be made without departing from the principle of the present invention, the scope of which is defined in the following claims.

What is claimed is:

1. A side printing apparatus for applying characters, symbols and the like as latent images to the marginal portions of a moving photographic film, said apparatus comprising:
   light emitting means for producing a dot pattern with light spots comprising a plurality of light emitting elements arranged in a linear array perpendicular to the direction of the advancement of film, said linear array being positioned above a marginal portion of the film and being longer than the width of said marginal portion;
   position detecting means for detecting the advanced length of said film to provide position signals;

control means for selectively driving said light emitting members to emit light in accordance with said position signals; and converging means for converging light rays from said light emitting members onto said marginal portion, said converging means comprising one circular converging lens means associated with said linear array of light emitting elements, said circular lens means being common to all said light emitting elements of said linear array.

2. Apparatus as claimed in claim 1, said control means having a memory in which data for the light emitting mode of the respective said light emitting members are stored in the order of light emission and from which said data can be retrieved sequentially with said position signals.

3. Apparatus as claimed in claim 2, wherein said memory is a random-access-memory.

4. Apparatus as claimed in claim 3, wherein said control means further has a central-processing-unit, and input-output port and a read-only-memory.

5. Apparatus as claimed in claim 1, for use with a film in the form of a strip having two longitudinal edges, there being a said linear array of light-emitting elements and one said circular converging lens means above each said longitudinal edge of the film strip.

6. Apparatus as claimed in claim 1, for use with a film in the form of a circular film disc, and means to rotate the disc beneath said array of light-emitting elements.

* * * * *